United States Patent
Park (10) Patent No.: US 10,986,145 B2
(45) Date of Patent: Apr. 20, 2021

(54) METHOD FOR RECORDING A SHARED SCREEN BASED ON ACTIONS AND APPARATUS FOR THE SAME

(71) Applicant: pplink, Inc., Seoul (KR)

(72) Inventor: Ju Rung Park, Seoul (KR)

(73) Assignee: pplink, Inc., Seoul (KR)

( * ) Notice: Subject to any disclaimer, the term of this patent is extended or adjusted under 35 U.S.C. 154(b) by 126 days.

(21) Appl. No.: 16/444,423

(22) Filed: Jun. 18, 2019

(65) Prior Publication Data
US 2020/0120149 A1    Apr. 16, 2020

(30) Foreign Application Priority Data

Oct. 11, 2018  (KR) .................. 10-2018-0120965
Dec. 7, 2018   (KR) .................. 10-2018-0156581

(51) Int. Cl.
*H04L 29/06*   (2006.01)

(52) U.S. Cl.
CPC ...... *H04L 65/4015* (2013.01); *H04L 65/4053* (2013.01)

(58) Field of Classification Search
CPC .............. H04L 65/4015; H04L 65/403; H04L 65/1089; H04L 51/046; H04L 51/10; H04N 7/155; G06T 13/80; G06F 3/04845; G06Q 10/101
See application file for complete search history.

(56) References Cited

U.S. PATENT DOCUMENTS

| | | | |
|---|---|---|---|
| 2009/0037453 A1* | 2/2009 | Kemmler | G06F 16/958 |
| 2012/0179959 A1* | 7/2012 | Lindgren | G06F 40/197 |
| | | | 715/234 |
| 2014/0157108 A1* | 6/2014 | Schmidt | G06F 40/14 |
| | | | 715/234 |
| 2015/0026118 A1* | 1/2015 | Ikejima | G06F 16/176 |
| | | | 707/608 |
| 2018/0227341 A1* | 8/2018 | Rizzi | H04L 65/403 |
| 2018/0300304 A1* | 10/2018 | Mullins | G06Q 10/101 |
| 2019/0155599 A1* | 5/2019 | Goldstein | G06F 8/71 |
| 2019/0250800 A1* | 8/2019 | Coldham | G06T 13/80 |

FOREIGN PATENT DOCUMENTS

| | | |
|---|---|---|
| KR | 20030096146 A | 12/2003 |
| KR | 101651353 B1 | 8/2016 |
| KR | 20170038614 A | 4/2017 |
| KR | 20170103929 A | 9/2017 |

* cited by examiner

*Primary Examiner* — Philip J Chea
*Assistant Examiner* — Mohammed Ahmed
(74) *Attorney, Agent, or Firm* — Dinsmore & Shohl LLP; Yongsok Choi, Esq.

(57) ABSTRACT

Provided is an action based shared screen recording method including providing a video call screen to a plurality of users, providing a shared screen to display one or more documents separately from the video call screen, reflecting and displaying a document manipulation performed by at least one of the plurality of users based on the displayed document, and recording in real time the shared screen reflecting the document manipulation, wherein the shared screen is recorded based on action information generated based on the document manipulation of the at least one user.

10 Claims, 5 Drawing Sheets

FIG. 5 a. type : 'Add', target : 'line1', payload : 'point1', timestamp : 1578
b. type : 'Add', target : 'line1', payload : 'point2', timestamp : 1584
c. type : 'Add', target : 'line1', payload : 'point3', timestamp : 1596
d. type : 'Add', target : 'line1', payload : 'point4', timestamp : 1630
e. type : 'Add', target : 'page1', payload : 'line2', timestamp : 1640
f. type : 'Add', target : 'line2', payload : 'point1', timestamp : 1645
g. type : 'Add', target : 'line2', payload : 'point2', timestamp : 1658
h. type : 'Add', target : 'line2', payload : 'point3', timestamp : 1669
i. type : 'Delete', target : 'page1', payload : 'line2', timestamp : 1710
j. type : 'Change', target : 'page1', payload : 'scale, 0.60', timestamp : 1743
k. type : 'Change', target : 'page1', payload : 'scale, 0.65', timestamp : 1750
l. type : 'Change', target : 'page1', payload : 'scale, 0.70', timestamp : 1766

FIG. 6A a. start : 1578, end : 1766
b. type : 'Adds', target : 'line1', payload : 'point1', 'point2', 'point3', 'point4'
c. type : 'Change', target : 'page1', payload : 'scale, 0.70'

FIG. 6B

METHOD FOR RECORDING A SHARED SCREEN BASED ON ACTIONS AND APPARATUS FOR THE SAME

CROSS-REFERENCE TO RELATED APPLICATION(S)

This application claims the priority benefit of Korean Patent Application No. 10-2018-0120965 filed on Oct. 11, 2018 and Korean Patent Application No. 10-2018-0156581 filed on Dec. 7, 2018, in the Korean Intellectual Property Office, the disclosure of which is incorporated herein by reference for all purposes.

BACKGROUND

1. Field

One or more example embodiments relate to a method for recording a shared screen using action information and an apparatus for the same and, more particularly, to a method and apparatus for reducing an amount of data of a recording by recording a screen shared in a video call, a video conference, or an online conference in which two or more people participate, based on actions.

2. Description of Related Art

With the development of the Internet and communications technology, diverse solutions and applications associated with a video call, a video conference, an online conference, or an electronic conference have been used, and some of the solution and the applications provide a screen sharing function to users participating in the call or the conference such that a screen displaying contents such as a document is shared. Further, in addition to the shared screen provision, a notetaking function which allows a user to write or draw various figures or lines on the shared screen is provided such that additional description or information may be provided on the shared data screen.

As described above, to provide a function to review the shared screen and notes provided to the users participating in the call or the conference, the shared screen should be recorded together with the notes. In this example, when the shared screen is recorded as is every instant at which the shared screen is captured, a large volume of data of about 700 megabytes (MB) or more should be stored per hour. Thus, there is a demand for a new type of recording method that may store a shared screen as a recording of a smaller volume. Further, there is a demand for a new type of recording method that may fast move to a middle point desired by a user and play back a recording of a shared screen from the corresponding point.

SUMMARY

An aspect provides a method and apparatus for reducing an amount of data of a recording by recording a screen shared in a video call, a video conference, or an online conference in which two or more people participate, based on an action associated with a manipulation of a user.

Another aspect also provides a method and apparatus for representing a recording with a smaller memory capacity by recording image information based on action information generated on a shared screen, when compared to an existing method of capturing a screen tens of times per second and generating a recording by combining the captured images of the screen.

Still another aspect also provides a shared screen recording and playback method that may fast calculate a state at a predetermined time point of a recording by utilizing patch information generated based on a plurality of items of action information between predetermined time intervals to fast move to a middle point of the recording desired by a user, when playing back a recorded shared screen.

The technical tasks obtainable from the present disclosure are non-limited by the above-mentioned technical tasks. And, other unmentioned technical tasks can be clearly understood from the following description by those having ordinary skill in the technical field to which the present disclosure pertains.

According to an aspect, there is provided an action based shared screen recording method including providing a video call screen to a plurality of users, providing a shared screen to display one or more documents separately from the video call screen, reflecting and displaying a document manipulation performed by at least one of the plurality of users based on the displayed document, and recording in real time the shared screen reflecting the document manipulation, wherein the shared screen is recorded based on action information generated based on the document manipulation of the at least one user.

Here, the document manipulation may include at least one of line drawing, figure drawing, highlighting, screen moving, screen zooming in, and screen zooming out. The action information may include type information related to a type of a document manipulation, target information related to a target of the document manipulation, payload information including details of the document manipulation, and timestamp information including time information of the document manipulation. The type information may include at least one of add, delete, and change. The target information may include at least one of a document page, a line, a point, a textbox, a figure, a link, and a shared screen board.

The action based shared screen recording method may further include generating patch information based on a document manipulation changed based on a start time point and an end time point of each predetermined time interval.

Here, the patch information may not include action information related to a target newly added and then deleted between the start time point and the end time point in the predetermined time interval. Further, the patch information may include only action information reflecting only a final result obtained by a change, when a target is changed between the start time point and the end time point in the predetermined time interval.

The action based shared screen recording method may further include using the patch information for a playback from a desired time point, when playing back a recorded shared screen.

According to another aspect, there is provided an action based shared screen recording apparatus including a video call provider configured to provide a video call screen to a plurality of users, a shared screen provider configured to provide a shared screen to display one or more documents separately from the video call screen, a user input receiver configured to receive a document manipulation performed by at least one of the plurality of user terminals based on the displayed document, and a shared screen recorder configured to record in real time a shared screen reflecting the document manipulation, wherein the shared screen recorder may include an action information generator, and the shared screen may be recorded based on action information generated by the action information generator based on the document manipulation of the at least one user.

Here, the document manipulation may include at least one of line drawing, figure drawing, highlighting, screen moving, screen zooming in, and screen zooming out. The action information may include type information related to a type of a document manipulation, target information related to a target of the document manipulation, payload information including details of the document manipulation, and timestamp information including time information of the document manipulation. The type information may include at least one of add, delete, and change. The target information may include at least one of a document page, a line, a point, a textbox, a figure, a link, and a shared screen board.

The shared screen recorder may further include a patch information generator configured to generate patch information based on a document manipulation changed based on a start time point and an end time point of each predetermined time interval, wherein the patch information may include timestamp information.

Here, the patch information may not include action information related to a target newly added and then deleted between the start time point and the end time point in the predetermined time interval. Further, the patch information may include only action information reflecting only a final result obtained by a change, when a target is changed between the start time point and the end time point in the predetermined time interval.

The action based shared screen recording apparatus may further include a shared screen player configured to play back a recorded shared screen, wherein the shared screen player may use the patch information for a playback from a desired time point.

Additional aspects of example embodiments will be set forth in part in the description which follows and, in part, will be apparent from the description, or may be learned by practice of the disclosure.

EFFECTS

According to an example embodiment, there is provided a method and apparatus for reducing an amount of data of a recording by recording a screen shared in a video call, a video conference, or an online conference in which two or more people participate, based on an action associated with a manipulation of a user.

According to an example embodiment, there is provided a method and apparatus for representing a recording with a smaller memory capacity by recording image information based on action information generated on a shared screen, when compared to an existing method of capturing a screen tens of times per second and generating a recording by combining the captured images of the screen.

According to an example embodiment, there is provided a shared screen recording and playback method that may fast calculate a state at a predetermined time point of a recording by utilizing patch information generated based on a plurality of items of action information between predetermined time intervals to fast move to a middle point of the recording desired by a user, when playing back a recorded shared screen.

The effects obtainable from the present disclosure are non-limited by the above-mentioned effects. And, other unmentioned effects can be clearly understood from the following description by those having ordinary skill in the technical field to which the present disclosure pertains.

BRIEF DESCRIPTION OF THE DRAWINGS

These and/or other aspects, features, and advantages of the disclosure will become apparent and more readily appreciated from the following description of example embodiments, taken in conjunction with the accompanying drawings of which.

DETAILED DESCRIPTION

Hereinafter, example embodiments will be described in detail with reference to the accompanying drawings, such that those having ordinary skill in the art to which the present disclosure pertains may easily practice the present disclosure. The present disclosure may, however, be embodied in many different forms and should not be construed as being limited to the example embodiments set forth herein.

The terminology used herein is for the purpose of describing particular example embodiments only and is not intended to be limiting. As used herein, the singular forms "a," "an," and "the," are intended to include the plural forms as well, unless the context clearly indicates otherwise.

It will further be understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In addition, terms such as first, second, A, B, (a), (b), and the like may be used herein to describe components. Each of these terminologies is not used to define an essence, order or sequence of a corresponding component but used merely to distinguish the corresponding component from other component(s). Also, in the description of example embodiments, detailed description of well-known related structures or functions will be omitted when it is deemed that such description will cause ambiguous interpretation of the present disclosure.

Furthermore, constituent units included in example embodiments of the present disclosure are independently illustrated to describe different specific functions, and each of the constituent units may not indicate separate hardware or one software element. That is, the respective constituent units are arranged and included for convenience of description. Among the constituent units, two or more constituent units may be combined to serve as one constituent unit, and one constituent unit may be divided into a plurality of constituent units to perform a function. The integrated example embodiment of the constituent units and the divided example embodiments of each constituent unit are included in the claims as long as they do not depart from the spirit of the present disclosure.

Hereinafter, example embodiments will be described in detail with reference to the accompanying drawings. The configuration and effects thereof can be clearly understood from the following description.

Figure 1:
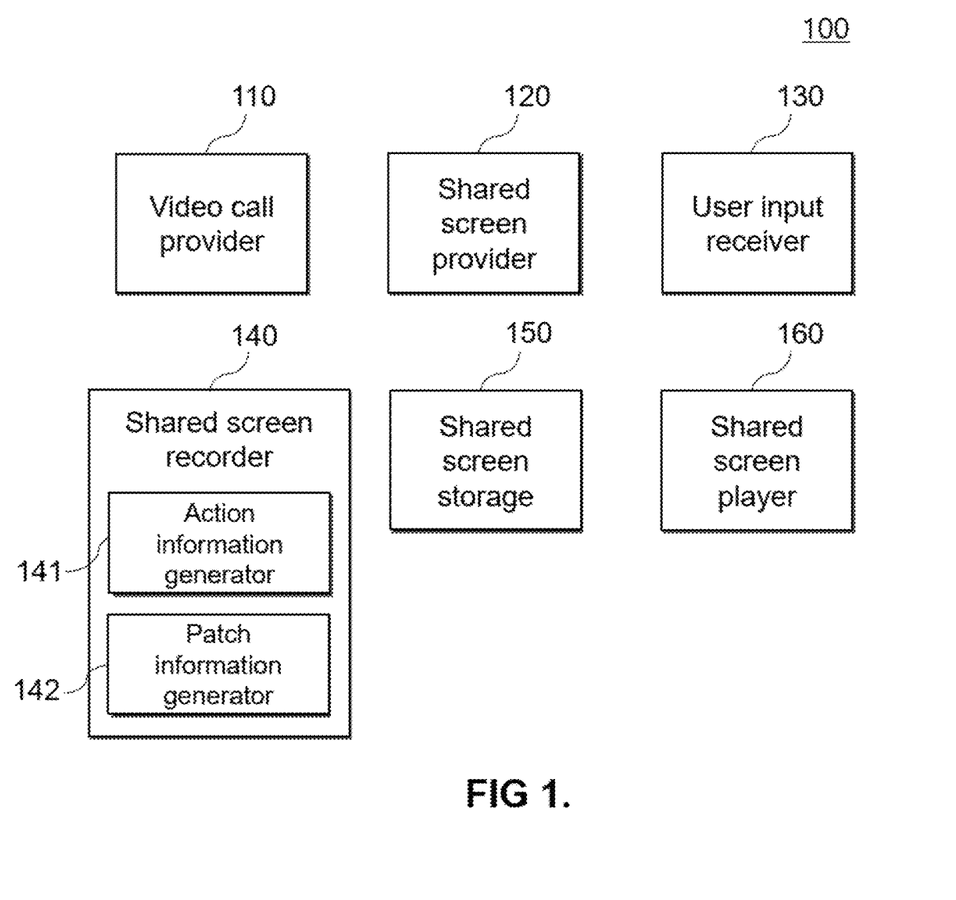
FIG. 1 is a block diagram illustrating a configuration of an action based shared screen recording apparatus according to an example embodiment.

FIG. 1 is a block diagram illustrating a configuration of an action based shared screen recording apparatus according to an example embodiment.

A shared screen recording apparatus 100 is an apparatus for executing an application or a software program associated with a video call, a video conference, an online conference, or an electronic conference, and may be a terminal that may receive, process, and display a variety of data via wired and wireless communication networks based on input and output manipulations of a user. In detail, the shared screen recording apparatus 100 may be, for example, one of a smart phone, a tablet computer, a desktop computer, a laptop computer, a notebook, a workstation, a personal digital assistant (PDA), a portable computer, a wireless phone, a mobile phone, an electronic book (e-book), a portable multimedia player (PMP), a portable game console, a digital camera, a television, a wearable device, and an artificial intelligence (AI) speaker. However, example embodiments are not limited thereto.

The shared screen recording apparatus 100 may include, for example, a video call provider 110, a shared screen provider 120, a user input receiver 130, a shared screen recorder 140, a shared screen storage 150, and a shared screen player 160.

The video call provider 110, the shared screen provider 120, the user input receiver 130, the shared screen player 160 may include programs or program modules executable by one or more processors of the shared screen recording apparatus 100. The programs or program modules may be configured in a form of operating systems, application programs, or programs, and may be physically stored on various types of widely used storage devices. Such programs or program modules may include one or more routines, subroutines, programs, objects, components, instructions, data structures, and various forms to perform predetermined tasks or execute predetermined data types. However, example embodiments are not limited thereto.

The video call provider 110 may be configured to provide a video call screen to a plurality of users for a video call, a video conference, an online conference, or an electronic conference. The video call screen may be provided by the video call provider 110 to the plurality of users, for example, two or more users participating in the video call or the conference.

The shared screen provider 120 may be configured to provide a shared screen to display contents desired to be shared, such as, for example, one or more documents, separately from the video call screen. Various types of contents, for example, a document, a presentation material, a web page, a contract, and a video, may be displayed on the shared screen, and a manipulation such as notetaking of a user may be reflected and displayed in such contents in real time. For example, at least a portion of the plurality of users may take notes on a document displayed on the shared screen, and perform at least one manipulation among, for example, line drawing, figure drawing, highlighting, screen moving, screen zooming in, and zooming out. A corresponding result may be displayed and shared on user screens in real time.

The user input receiver 130 may be configured to receive a document manipulation performed by at least one of the plurality of users based on the contents provided on the shared screen. The user input receiver 130 is an element to receive various inputs from users in various manners, and may be configured to receive user inputs from at least one of a keyboard, a touch pad, a touch screen, a keypad, a dome switch, a physical button, a jog shuttle, a sensor, and a microphone.

The shared screen recorder 140 may be configured to record in real time a shared screen reflecting manipulations of the users. The shared screen recorder 140 may include an action information generator 141, and the shared screen may be recorded based on action information generated by the action information generator 141 based on a manipulation of at least one user.

The action information may include, for example, type information related to a type of a document manipulation, target information related to a target of the document manipulation, payload information including details of the document manipulation, and timestamp information including time information of the document manipulation.

In detail, the type information may include the content associated with a type of a manipulation action, for example, add, delete, or change. Here, add is used to add a sub-entity to an entity. For example, a point is added to a line when a manipulation action of drawing a line is performed. Delete is used to delete a sub-entity of an entity and, for example, occurs when a manipulation action of erasing a line from a page is performed. Further, change is used to change a value of an entity and, for example, occurs when a scale of a page is changed, that is, when a manipulation action of zooming in or out the page is performed.

Here, the entity is a fundamental unit to which a manipulation action of a user is applied, and may include, for example, target information, such as, a document page, a line, a point, a textbox, a figure, a link, and a shared screen board. All elements displayed for a user may be regarded as entities. When an action is applied to an entity, a state or a shape of the entity may be changed.

Next, the target information indicates an entity to which the corresponding action is applied. In an example of "Add a point to line 1," line 1 is a target. In an example of "Change the scale of page 2 to 1.5," page 2 is a target.

Next, the payload information is detailed data contained in the corresponding action, and is information including details as in "Add point(15, 16) to line 1," or "Change the scale of page 2 to 1.5."

Last, the timestamp information is time information of the corresponding action, and may be time information numerically expressed based on a predetermined criterion.

In detail, in an example of action information, "type: 'Add', target: 'line1', payload: 'point1', timestamp: 1578" indicates that point1 is added to line1 at a time point corresponding to timestamp 1578. "type: 'Change', target: 'page1', payload: 'scale, 0.6', timestamp: 1603" indicates that the scale of page1 is changed to 0.6 at a time point corresponding to timestamp 1603. "type: 'Delete', target: 'page2', payload: 'line1', timestamp: 1780" indicates that line1 is removed from page2 at a time point of timestamp 1780. "type: 'Change', target: 'textbox1', payload: 'value, the purpose of this document', timestamp: 1850" indicates that the content of textbox1 is changed to "the purpose of this document" at a time point of timestamp 1850.

Meanwhile, the shared screen recorder 140 may further include a patch information generator 142 configured to generate patch information based on the above action information using a document manipulation changed based on a start time point and an end time point of each predetermined time interval.

The patch information generated by the patch information generator 142 is generated at a predetermined time interval, and includes timestamp information as in the action information. Further, the patch information is not a set of simple action information, but a data storage unit which includes information related to a start and an end of a state change in a corresponding period by compressing pieces of action information, and records only a difference in the state change between a start time point and an end time point.

For example, the patch information does not include action information related to a target newly added and then deleted between a start time point and an end time point in a predetermined time interval. Further, when a target is changed between a start time point and an end time point in a predetermined time interval, the patch information includes only action information reflecting only a final result obtained by the change. As described above, the patch information stores only a matter changed at the start and end time points. The example of generating patch information will be described further with reference to FIGS. 6A and 6B.

Here, the shared screen recorder 140, the action information generator 141, and the patch information generator 142 may include programs or program modules executable by one or more processors. The programs or program modules may be configured in a form of operating systems, application programs, or programs, and may be physically stored on various types of widely used storage devices. Such programs or program modules may include one or more routines, subroutines, programs, objects, components, instructions, data structures, and various forms to perform predetermined tasks or execute predetermined data types. However, example embodiments are not limited thereto.

The shared screen storage 150 may be configured to store a recorded video of the shared screen, and include a memory to store instruction programs or data associated with shared screen recording. The shared screen storage 150 may include RAM, ROM, flash memories, hard drives, or any device capable of electronic data. The shared screen storage 150 may store the video of the shared screen recorded through the shared screen recorder 140, the action information generated by the action information generator 141, and the patch information generated by the patch information generator 142.

Further, data or programs required by other elements such as the shared screen recorder 140 and the shared screen player 160 may be retrieved from the shared screen storage 150.

Last, the shared screen player 160 may be configured to play back the recorded shared screen, and the shared screen player 160 may use the patch information generated by the patch information generator 142 for a playback from a desired time point.

For example, a 4-minute recording may be played back. When a user desires to play back the recording from a time point of 2 minutes, not from the beginning, the user may play back the recording from the desired time point. In this example, when patch information is absent, all actions from the beginning to the time point of 2 minutes need to be applied to play back the recording from the time point of 2 minutes. However, according to the example embodiment, patch information is generated at a predetermined interval, and thus it is possible to fast move to the desired time point by retrieving patch information suitable for the corresponding time point. Further, when the patch information is used to play back the recording as described above, the waste of computing resources may be reduced, and the responsiveness may remarkably increase.

Figure 2A:
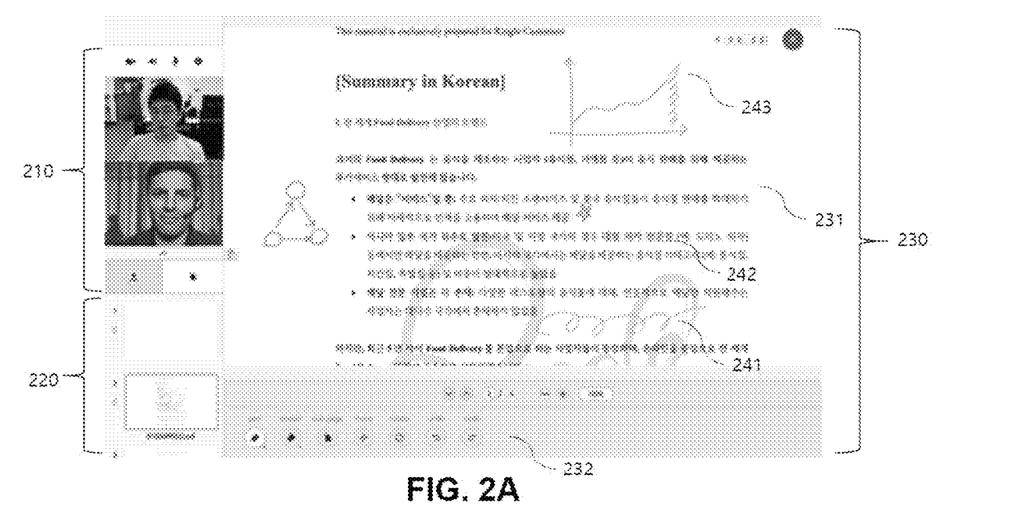
FIG. 2A illustrates an example of a recorded screen of an action based shared screen according to an example embodiment.
Figure 2B:
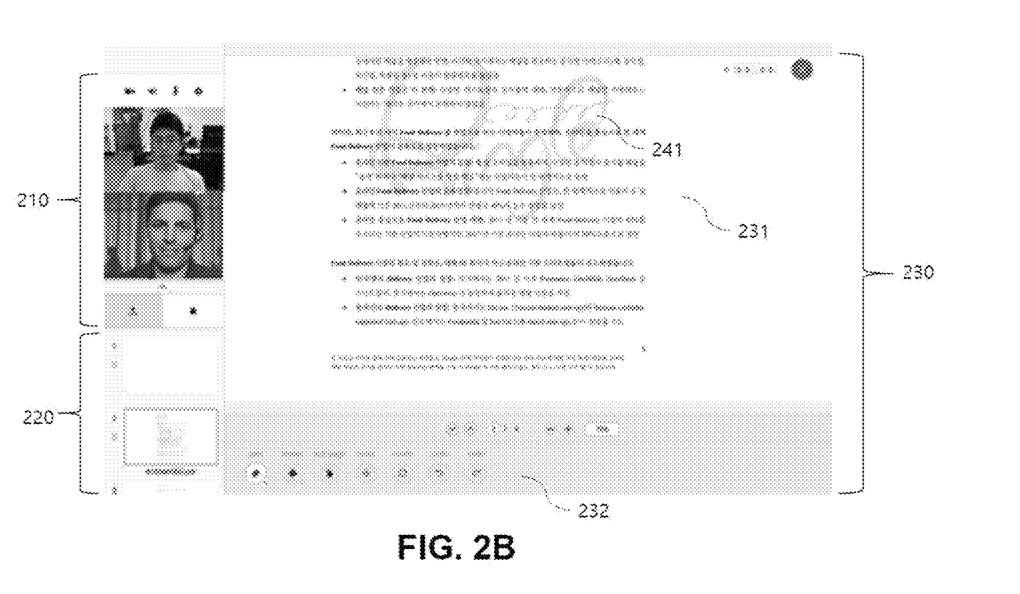
FIG. 2B illustrates an example of a recorded screen of an action based shared screen according to an example embodiment.

FIGS. 2A and 2B illustrate an example of a recorded screen of an action based shared screen according to an example embodiment.

Referring to FIG. 2A, a video call screen 210 may be displayed in real time together with related functions. Two or more participants may be displayed on the video call screen 210. The video call screen 210 may be deactivated, as necessary, if participants do not need to be displayed. In this example, only voices of the participants may be provided, without displaying a call image screen of the participants.

In an example, a shared contents menu screen 220 may be provided below the video call screen 210 to retrieve, select, and change desired contents to be shared. For example, screen sharing may be performed by retrieving, selecting, and displaying a document such as a PDF, Microsoft Word, or Hangul Office file through the shared contents menu screen 220.

A contents shared screen 230 on which the selected contents is displayed and shared may include a contents display unit 231 to display the corresponding contents, and a contents manipulation unit 232 to allow a user to perform a function to manipulate the corresponding contents.

For example, functions such as screen moving, screen zooming in/out, new contents retrieval, document moving, document scrolling, line drawing on the document, highlighting, figure drawing, graph drawing, and notetaking may be performed through the contents manipulation unit 232. As shown in FIG. 2A, a document may be shared on the contents display unit 231, and a line 241, a highlight 242, and a graph 243 provided by a portion of the users may be displayed and shared together on the document. As described above, a shared screen reflecting manipulations of users may be provided in real time on contents such as a document to be shared, and a shared screen may be recorded.

FIG. 2B illustrates an example of zooming out and scrolling down a document screen shared on the contents display unit 231 of FIG. 2A. In the contents display unit 231 of FIG. 2B, only the line 241, among the line 241, the highlight 242, and the graph 243 shown in FIG. 2A, is shown in response to a manipulation of the user zooming out and scrolling down the screen.

Such a recorded screen of a shared screen may be modified and applied in various manners to provide a user with convenient functions to retrieve, manipulate, and change contents to be shared.

Figure 3:
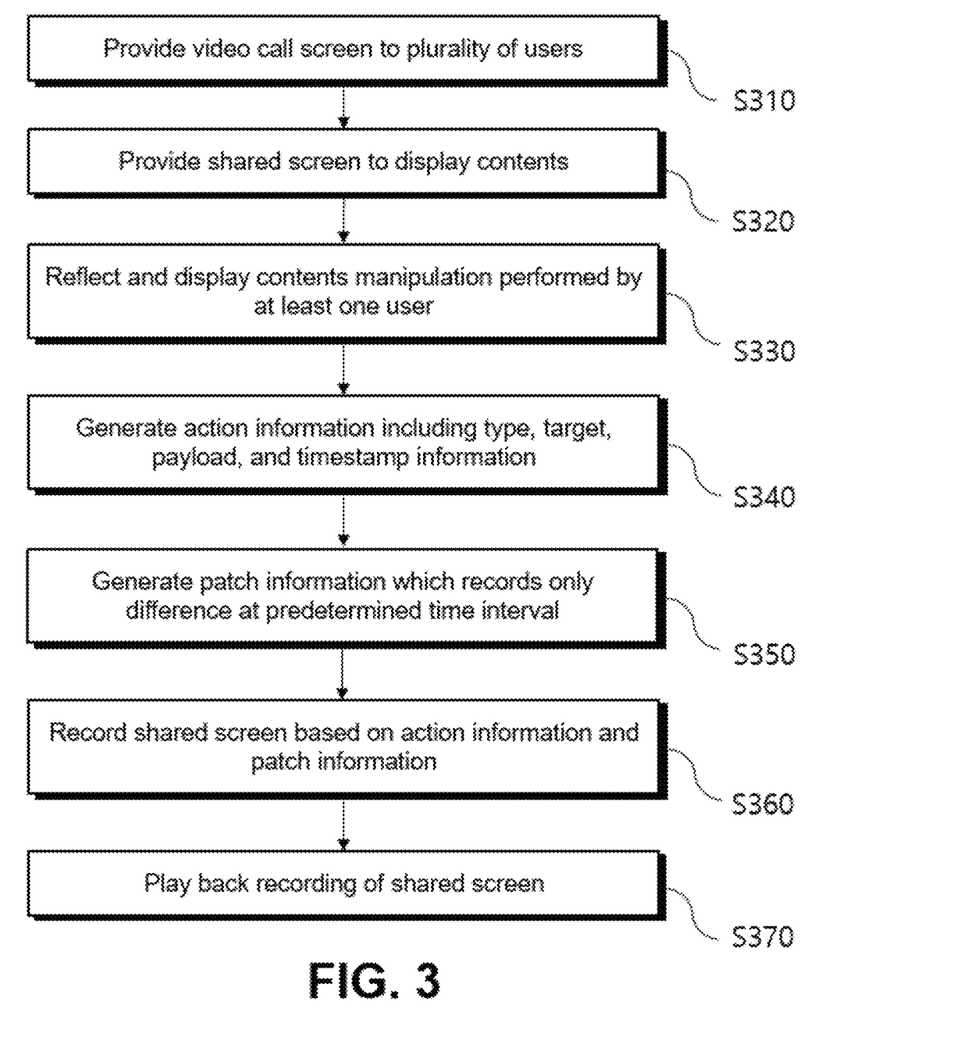
FIG. 3 is a flowchart illustrating an action based shared screen recording method according to an example embodiment.

FIG. 3 is a flowchart illustrating an action based shared screen recording method according to an example embodiment.

In operation S310, a video call screen may be provided to a plurality of users, for example, two or more users. In this example, if the video call screen is unnecessary, only voices of participants may be provided without displaying the video call screen of the users.

In operation S320, a shared screen to display contents such as a document may be provided to the participants. When the users participating in a video call desire to share contents such as a document, the shared screen to display the contents may be provided together with the video call screen.

In operation S330, a contents manipulation performed by at least one user may be reflected and displayed on the shared screen provided to the plurality of users. A portion of the plurality of users may take notes on a document displayed on the shared screen. For example, contents changed by a manipulation through line drawing, figure drawing, highlighting, screen moving, screen zooming in, and screen zooming out may be displayed in real time on a user screen, and the shared screen displayed in this manner may be recorded.

In operation S340, action information including type, target, payload, and timestamp information may be generated for recording an action based shared screen. Action information related to a plurality of user manipulations performed on the shared screen may be generated, and the shared screen may be recorded on an action-by-action basis by recording timestamps of actions.

Further, to classify and record manipulations performed by the plurality of users on the shared screen for respective users, information on a user performing a corresponding action may be included in each piece of action information. In this example, the user information related to the corresponding action may be displayed together, as necessary, when the recorded shared screen is played back based on the action information.

In operation S350, patch information which records only a difference may be generated at a predetermined time interval. Patch information including difference information about a start and an end of a state change may be generated at a predetermined time interval by compressing a plurality of items of action information, whereby a state changed by a manipulation at a predetermined time point may be calculated very fast.

In operation S360, the shared screen may be recorded based on the action information and the patch information generated as described above. For example, when the shared screen is recorded as is, a memory capacity of about 700 mega bytes (MB) or more may be required per hour. However, a recording generated based on the action information may be stored even with a memory capacity of 60 MB, which is about 1/10 or less. Thus, an amount of data may be remarkably reduced.

In operation S370, the recording of the shared screen may be played back by a user. The user may quickly move to a desired point and play back the recording from the point based on the patch information generated at the predetermined interval.

Figure 4:
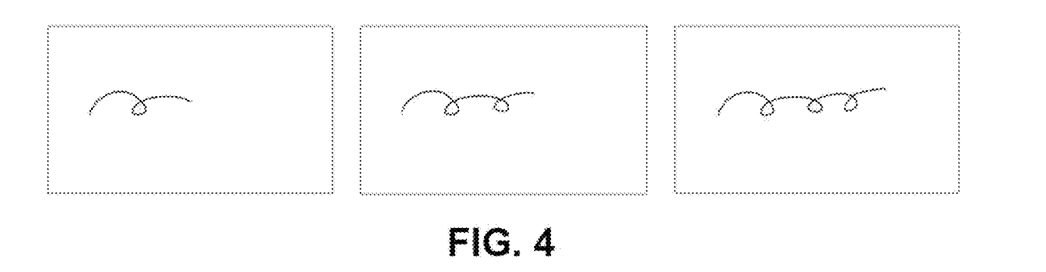
FIG. 4 illustrates an example of recording a line drawing screen according to an example embodiment.

FIG. 4 illustrates an example of recording a line drawing screen according to an example embodiment.

For example, in an existing scheme, when assuming a screen is captured each instant at which a line is drawn, and recorded as a recording including 60 frames per second, the screen is captured 60 times per second, and a recording is generated by combining the captured images of the screen.

On the contrary, in the present disclosure, manipulations may be stored on an action-by-action basis by recording timestamps for actions occurring when a line is drawn. Since the size of action information may be significantly smaller than the size of the captured images of the screen, the recording may be represented and generated with a much smaller memory capacity.

For example, action information related to line drawing may be a set of data such as {type: addPoint, timestamp: 12, x: 34, y: 56}, {type: addPoint, timestamp: 15, x: 55, y: 78}, {type: addPoint, timestamp: 18, x: 88, y: 22}, and {type: addPoint, timestamp: 23, x: 98, y: 23} which represent the recording.

Figure 5:
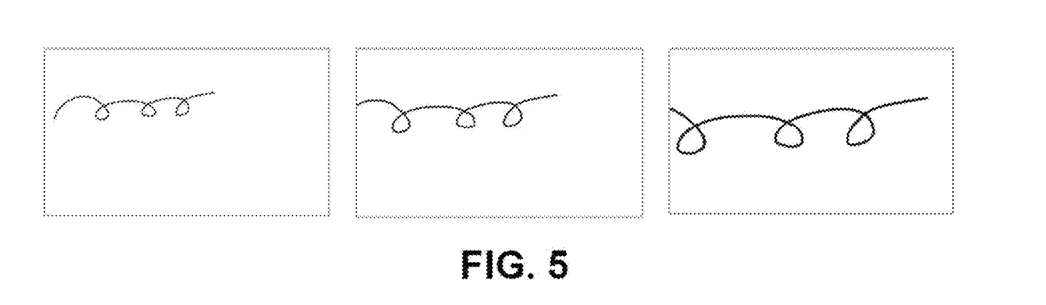
FIG. 5 illustrates an example of recording a scene of zooming in a screen according to an example embodiment.

FIG. 5 illustrates an example of recording a scene of zooming in a screen according to an example embodiment.

For example, in an existing scheme, when assuming a screen is captured each instant at which a shared screen is zoomed in, and recorded as a recording including 60 frames per second, the screen is captured 60 times per second, and a recording is generated by combining the captured images of the screen.

On the contrary, in the present disclosure, actions occurring when the screen is zoomed in may be stored by recording timestamps for the actions. Since the size of action information may be significantly smaller than the size of the captured images of the screen, the recording may be represented and generated with a much smaller memory capacity.

For example, action information related to screen zooming in may be a set of data such as {type: changeView, timestamp: 12, scale: 1.21}, {type: changeView, timestamp: 15, scale: 1.24}, {type: changeView, timestamp: 18, scale: 1.32}, and {type: changeView, timestamp: 23, scale: 1.45} which represent the recording.

Figure 6A:
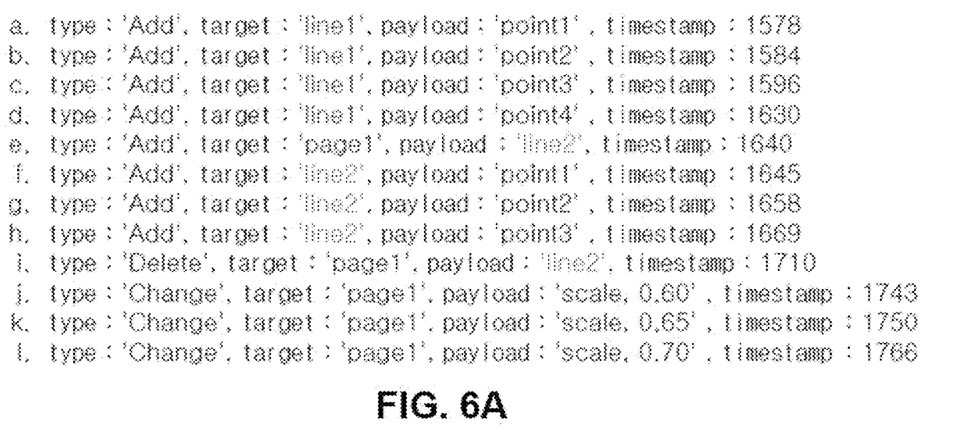
FIG. 6A illustrates codes including a plurality of pieces of action information to generate a patch according to an example embodiment.

FIG. 6A illustrates codes including a plurality of pieces of action information to generate a patch according to an example embodiment.

A set of example actions shown in FIG. 6A will be described. Manipulations of adding points, for example, point1 to point4, to line1 with respect to a to d, adding points, for example, point1 to point3, after generating line2 on page1 with respect to e to h, deleting line2 from page1 with respect to i, and sequentially increasing the scale of page1 to 0.6, 0.65, and 0.7 with respect to j to 1 are sequentially represented using action data including respective timestamp information.

In summary, the actions shown in FIG. 6A are (1) adding points to line1, (2) adding points after generating line2 on page1, (3) deleting line2 from page1, and (4) increasing the scale of page1 to 0.7.

Figure 6B:
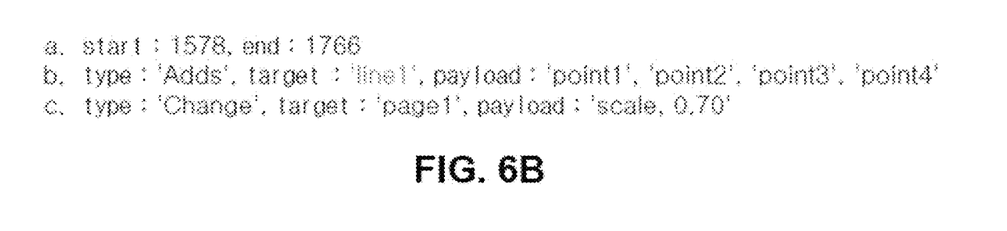
FIG. 6B illustrates codes indicating generated patch information according to an example embodiment.

The set of actions performed in a predetermined time interval as described above may be generated as patch information as shown in FIG. 6B.

Here, when patch information is generated based on a plurality of pieces of action information, it should be noted that line2 does not appear in the patch information since line2 is deleted after generated in the middle of a single patch. As described above, the patch information includes only a matter changed between a start and an end. Further, the patch information includes only a final value, rather than containing an intermediate process in which the scale of page1 is changed. The patch information is a data storage unit to record only a difference, and the plurality of pieces of action information may be much summarized and stored in the corresponding time period, and thus a memory capacity required for the action information may be considerably reduced.

Since a state at a predetermined time may be calculated fast if the patch information is generated at an hourly interval and retained in the manner described above, all actions, for example, from a timestamp 1578 to a timestamp 1766 do not need to be applied, and only a single path needs to be applied. Thus, a rewinding or fast-forward function may be performed more efficiently.

Although the method for recording a shared screen based on an action and the apparatus for the same have been described in detail above through a number of example embodiments, the present disclosure is not limited thereto and should be construed as having the widest range according to the basic spirit disclosed herein. Those skilled in the art may implement a pattern of a form not stated above by combing or replacing the disclosed example embodiments, which should also be construed as within the scope of the present disclosure. Further, it will be apparent to those skilled in the art that various modifications and variation can be easily made to these example embodiments without departing from the spirit or scope of the claims.

What is claimed is:

1. A method for recording a shared screen using action information, the method comprising:
    providing a shared screen to display one or more documents on a plurality of user terminals;
    reflecting a plurality of document manipulations performed on at least one of the plurality of user terminals based on a document displayed on the shared screen;
    generating action information based on each of the plurality of document manipulations; and
    generating patch information based on a document manipulation changed based on a start time point and an end time point of each of a plurality of predetermined time intervals,
    wherein the action information includes type information related to a type of a document manipulation, target information related to a target of the document manipulation, payload information including details of the document manipulation, and timestamp information including time information of the document manipulation,
    wherein the patch information includes type information related to a type of a document manipulation, target information related to a target of the document manipulation, payload information including details of the document manipulation, and timestamp information including time information of the document manipulation, and
    wherein the patch information includes only action information reflecting only a final result obtained by a manipulation in relation to a target of a document manipulation between the start time point and the end time point.

2. The method of claim 1, wherein the document manipulation includes at least one of line drawing, figure drawing, highlighting, screen moving, screen zooming in, and screen zooming out.

3. The method of claim 1, wherein the type information includes at least one of add, delete, and change, and the target information includes at least one of a document page, a line, a point, a textbox, a figure, a link, and a shared screen board.

4. The method of claim 1, wherein the patch information does not include action information related to a target newly added and then deleted by the document manipulation between the start time point and the end time point.

5. The method of claim 1, further comprising:
    using the action information and the patch information for a playback from a desired time point, when playing back a recorded shared screen.

6. An apparatus for recording a shared screen using action information, the apparatus comprising:
    a processor programmed to:
    provide a shared screen to display one or more documents on a plurality of user terminals,
    receive document manipulations performed by at least one of the plurality of user terminals based on a document displayed on the shared screen,
    generate action information based on each of the plurality of document manipulations, and
    generate patch information based on a document manipulation changed based on a start time point and an end time point of each of a plurality of predetermined time intervals,
    wherein the action information includes type information related to a type of a document manipulation, target information related to a target of the document manipulation, payload information including details of the document manipulation, and timestamp information including time information of the document manipulation,
    wherein the patch information includes type information related to a type of a document manipulation, target information related to a target of the document manipulation, payload information including details of the document manipulation, and timestamp information including time information of the document manipulation, and
    wherein the patch information includes only action information reflecting only a final result obtained by a manipulation in relation to a target of a document manipulation performed between the start time point and the end time point.

7. The apparatus of claim 6, wherein the document manipulation includes at least one of line drawing, figure drawing, highlighting, screen moving, screen zooming in, and screen zooming out.

8. The apparatus of claim 6, wherein the type information includes at least one of add, delete, and change, and the target information includes at least one of a document page, a line, a point, a textbox, a figure, a link, and a shared screen board.

9. The apparatus of claim 6, wherein the patch information does not include action information related to a target newly added and then deleted by the document manipulation between the start time point and the end time point.

10. The apparatus of claim 6, wherein the processor is further programmed to:
    play back a recorded shared screen, and
    use the action information and the patch information for a playback from a desired time point.

* * * * *